United States Patent Office 3,280,033
Patented Oct. 18, 1966

3,280,033
ALKENYL SUCCINAMIC ACIDS AS RUST INHIBITORS AND DISPERSANTS
Alan Y. Drummond, Sutton Courtenay, England, assignor to Esso Research and Engineering Company, a corporation of Delaware
No Drawing. Filed Aug. 15, 1963, Ser. No. 302,454
Claims priority, application Great Britain, Aug. 30, 1962, 33,392/62
6 Claims. (Cl. 252—51.5)

This invention relates to mineral oil compositions containing an amic acid, which compositions have useful properties for the inhibition of rust, and also for the dispersion of particles contained therein.

There is a continuing need to provide mineral oil compositions including gasoline, kerosine, spindle oils, gas oils, and heavy lubricating oils, which do not corrode metal parts with which they come into contact, for instance, during storage or when used in injector equipment or other ancillary parts of internal combustion engines.

It has been discovered that useful additives for such purposes are provided by reacting an alkenyl-substituted succinic acid or anhydride with a polyamine containing at least two nitrogen atoms separated by at least two carbon atoms, under conditions to obtain an amic acid.

Amic acids thus prepared may be represented by the general formula:

(a)          S—A
(b)          S—A—S
(c)          S—A—S
                              |
                              S wherein

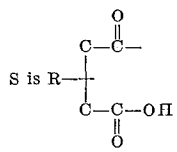

S is R—

R being an alkenyl group containing from 15 to 300 carbon atoms, and A is a basic organic group containing at least two nitrogen atoms separated by at least 2 carbon atoms and wherein the carbonyl group in each "S" group is connected to a nitrogen atom in the "A" group.

It is to be understood that in the "S" groups, each of the carbon atoms has the appropriate number of hydrogen atoms attached thereto necessary to satisfy the carbon valences.

Compounds according to the foregoing general formulae normally exist in the form of their internal salt, wherein a proton is donated by the hydroxyl group of the acid of the molecule to a basic nitrogen atom in the same molecule.

In carrying out the reaction between the alkenyl-substituted succinic compound and the polyamine to form the amic acid, the mole proportions of polyamine to the succinic acid or anhydride should not be greater than 1:1, and preferably range from 1:3 to 1:1. Thus using a ratio of 1:1, an amic acid of the general formula S—A as hereinbefore described is obtained, and using a ratio of 1:3 an amic acid of the general formula

S—A—S
|
S as hereinbefore described is produced.

It is to be understood that in forming the amic acids as hereinbefore described in the general formulae, a mixture of such amic acids may be produced, the said mixture being incorporated in the mineral oil compositions according to the invention.

It is preferred that alkenyl-substituted succinic anhydride is used as a co-reactant with the polyamine, and using the anhydride, the reaction between the succinic anhydride and the polyamine must be carried out under conditions whereby no production of water of reaction takes place. Reaction between the compounds takes place satisfactorily at room temperature e.g. 15° C. The reaction is exothermic in nature, and it is undesirable to allow the reaction mixture ot reach a temperature which will cause internal condensation of the molecule with the formation of the corresponding imide, or diamide and the formation of water. It is thus preferable that the temperature during the reaction does not rise above about 90° C. If an alkenyl substituted succinic acid is used as a precursor of the additives of the invention, care should be taken to produce only one mole of water per mole of succinic acid. If two moles of water are produced then the imide or diamide is formed. However as this reaction is more difficult to control than when using the anhydride as the precursor, the former method is preferred in the practice of the invention. Formation of the further reaction product is undesirable as mineral oils containing the imide or diamide have inferior rust inhibiting properties compared with the amic acid derivatives according to the invention.

The function of the alkenyl groups in the final additive compound is believed to denote solubility in the mineral oil in which it is incorporated. Thus for gasolines, the number of carbon atoms in the alkenyl chain of the final additive is preferably from 15 to 40. If the additive compounds are to be incorporated in fuel oils heavier than gasoline or in lubricating oils, then a number of carbon atoms from 35 to 150 will give optimum effect.

The mono-alkylene substituted succinic acid or anhydride used in the reaction with the polyamine according to the invention, may be obtained by reacting an olefinic hydrocarbon with maleic anhydride, which is converted during the reaction to the required substituted succinic compound.

The preferred olefins are polymers derived from ethylene, propylene, butenes or mixtures thereof. The polymerization may be achieved by any known method, including high or low pressure polymerization process to produce olefins having a molecular weight between 210 and 4200.

Particularly preferred embodiments of the additives incorporated in the invention are those obtained as follows:

(1) By reacting the mono-alkylene substituted succinic compound with an ethylene polyamine represented by the general formula:

$$H_2N(CH_2CH_2NH)_xH$$

where $x$ is an integer of from 1 to 10. Particularly preferred polyamines are diethylene triamine, triethylene tetramine and tetra-ethylene pentamine. Mixtures of these specific polyamines or of the higher homologues may with advantage be used in the reaction. Useful products are also obtained using the propylene analogues of the ethylene polyamines herein described.

Analogous polyamines of this class which may be used are those in which one or more of the methylene groups contains a $C_1$–$C_3$ alkyl group as a substituent group.

Reaction between the carboxylic group and the polyamine described above may take place either with the primary or a secondary amine group (when present) of the polyamine.

(2) By reacting the monoalkylene substituent succinic compound with a diamine compound containing a secondary or tertiary amine group, represented by the general formula:

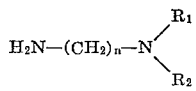

wherein $n$ is an integer from 2 to 6, and $R_1$ is hydrogen or a $C_1$–$C_6$ group, and $R_2$ is a $C_1$–$C_6$ alkyl group. Analogous diamines of this class which may be used are those in which one or more of the methylene groups contain a $C_1$–$C_3$ alkyl group as a substituent group.

Particularly preferred diamines of this class are N,N-dimethyl (or diethyl)-1,3 diamine propane or the corresponding diamino-ethane.

When the above class of diamines contains a secondary amine group, the reaction between the carboxylic group of the succinic derivative and the diamine may take place with either the primary or secondary amine group of the polyamine.

(3) By reacting the mono-alkylene substituted succinic compound with a cyclic polyamine compound, represented by the general formula:

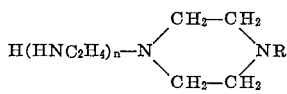

wherein $n$ is an integer from 0 to 3 and R is hydrogen or a $C_1$–$C_3$ alkyl group.

The reaction between the substituted piperazines of the above class and the carboxylic group of the succinic derivative may take place between either a primary amine group or a secondary amine group where such group exists.

The preferred compound of the above class of cyclic polyamines is N-(2-amino ethyl)-piperazine.

The reaction between the succinic compound and the polyamine may be carried out in an inert solvent, for instance mineral oil or other liquid hydrocarbon, the product being formed as an oil solution.

The mineral oil composition of the invention may include the concentrate obtained from the reaction, or the oil concentrate may be diluted or cut back with mineral oil to the required formulation and consistency.

Thus useful lubricating compositions according to the invention for use in internal combustion engines or in steam turbines may contain from 0.1 to 10% by weight of the amic acid, calculated as active ingredient. Fuel oils, particularly gasolines, diesel oils and gas oils may contain from 0.001% to 5% of the constituent.

The compositions of the invention may contain further additives conventionally incorporated in fuel and lubricating oil compositions, including anti-oxidants, anti-wear agents, colour stabilizers and high-temperature detergent compounds.

The invention as illustrated by the following examples and comparative experiments.

*Example I*

An anhydride was prepared from maleic anhydride which had been reacted with polyisobutylene of molecular weight 800. The saponification number of the resulting alkenyl succinic anhydride was 88. 200 grams of the alkenyl succinic anhydride were dissolved in 100 grams of xylene, and 19.5 grams of triethylene tetramine incorporated in the solution over a period of time of 15 minutes. The temperature of the reaction solution was initially 20° C. and was gradually increased to 60° C. The first reaction product in the xylene solvent was shown by infra-red spectrographic analysis to be an amic acid.

A kerosene composition was provided by incorporating 0.25 wt. percent of active ingredient of the reaction product hereinbefore described in kerosene, and labelled "Blend A," and tested for corrosion inhibiting properties, according to the following procedure.

10 cc. of water and 10 cc. of Blend A were placed in a cylinder. Steel and copper strips were immersed in the kerosene layer only for 30 secs. and then in both layers, and then placed in contact with each other. The steel strip was inspected at intervals for rusting, the degree of rusting being assessed on a scale in which 10 denotes no rusting and 0 denotes heavy rusting.

To indicate the advantage of using the amic acid according to the invention over the imide, the amic acid solution prepared according to Example I was further heated under reflux at 145° C. for half an hour, whereby water of reaction was removed. Infra-red analysis of the product indicated that it was an imide. 0.25% by weight of active ingredients of the imide reaction product was incorporated in kerosene and labelled "Blend B" and subjected to the same corrosion tests of Blend A. The results are recorded in Table I:

TABLE I.—DEGREE OF RUSTING PREVENTION

| Time | Kerosine | Blend A | Blend B |
| --- | --- | --- | --- |
| 24 hours | 9.5 | 10.0 | 9.5 |
| 48 hours | 8.0 | 8.5 | 9.0 |
| 120 hours | 6.0 | 8.0 | 6.0 |
| 144 hours | 4.0 | 7.5 | 4.0 |

It will be noted from Table I that the blend according to the invention inhibited the formation of rust, and that the rust inhibiting properties of the blend according to the invention were substantially better than that donated by the corresponding imide.

*Example II*

An amic acid was prepared according to the method of Example I, from 3 equivalents of the alkenyl succinic anhydride of Example I and II equivalents of aminoethyl piperazine. 0.1 percent wt. of the resulting amic acid was incorporated in kerosine, and designated Blend C. The blend was tested for rust prevention by the method hereinbefore described, with the results shown in Table II.

TABLE II.—DEGREE OF RUSTING PREVENTION

| Time | Kerosine | Blend C |
| --- | --- | --- |
| 16 hours | 5.5 | 10 |
| 24 hours | 4.5 | 9 |

*Example III*

Three amic acids derived from alkenyl succinic having differing alkenyl groups and from differing polyamines were prepared, using the reaction procedure of Example I. Blends of the resulting amic acids in gasoline were prepared, using 0.1 wt. percent of active ingredient of the amic acid. The blends were given the following designations:

| | No. of carbon atoms in alkenyl group of succinic anhydride | Polyamine used |
| --- | --- | --- |
| Blend D | 21 | Diethylene triamine. |
| Blend E | 21 | Tetraethylene pentamine. |
| Blend F | 32 | Triethylene tetramine. |

The blends were tested for rust-inhibition according to the procedure set out in Example I. The results are given in Table III after a test time of 5 hours:

TABLE III.—DEGREE OF RUSTING PREVENTION

```
                                                   Rating
Gasoline _____ 3.0
Blend D _____ 7.5
Blend E _____ 8.5
Blend F _____ 6.5
```

Example IV 2.5% by weight of active constituent of the amic acid produced as described in Example I was dissolved in a mineral SAE 30 grade lubricating oil, the blend being designated "Blend G."

The dispersing property of this blend was tested by the following procedure:

10 cc. of a standard engine sludge from a used oil were incorporated in 90 cc. of Blend G, and the mixture stirred for 15 minutes at 85° C. The mixture was then heated to 90° C. and stood for 24 hours. After this time the top 25% by volume of the dispersion was removed and diluted with 75 cc. of a heptane, and centrifuged for 1 hour at 1500 r.p.m. All the sludge is newly deposited. The sludge suspension property was then evaluated as the number of cc. of sludge thrown down by centrifuging × 100. The results are shown in Table IV:

TABLE IV.—SLUDGE DISPERSANCY

|  | Blend G | Base Oil |
|---|---|---|
| Percent sludge suspended | 55 | 0 |

What is claimed is:

1. A mineral oil composition comprising a major amount of a mineral oil selected from the group consisting of mineral lubricating oils and normally liquid hydrocarbon fuels and a minor amount, sufficient to inhibit rust and to provide dispersancy, of at least one amic acid represented by the general formulae.

(a) S—A
(b) S—A—S
(c) S—A—S
      |
      S wherein

S is 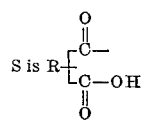

R being an alkenyl group containing from 35 to 300 carbon atoms, and A is derived from a polyamine selected from the group consisting of alkylene polyamines, polyalkylene polyamines and piperazines and wherein said polyamine contains at least two nitrogen atoms separated by at least two carbon atoms, and wherein the carbonyl group in each "S" group is connected to a nitrogen atom in the "A" group.

2. A mineral oil composition as claimed in claim 1 which is a composition of mineral oil heavier than gasoline.

3. A composition as defined by claim 1 wherein said mineral oil is a mineral lubricating oil and wherein said minor amount of said amic acid is about 0.1 to about 10 wt. percent.

4. A composition as defined by claim 1 wherein said polyamine is tetraethylene pentamine.

5. A composition as defined by claim 1 wherein said alkenyl group is polyisobutylene of about 800 molecular weight.

6. A mineral oil composition comprising a major amount of kerosine oil and about 0.25 wt. percent of the amic acid of essentially equal molar proportions of polyisobutenyl succinic anhydride and triethylene tetramine, wherein said polyisobutenyl group has a molecular weight of 800.

References Cited by the Examiner

UNITED STATES PATENTS

| 2,490,744 | 12/1949 | Trigg et al. | 252—51.5 X |
| 2,604,451 | 7/1952 | Rocchini | 252—51.5 |
| 2,699,427 | 1/1955 | Smith et al. | 44—71 X |
| 2,982,633 | 5/1961 | Andress | 44—71 |
| 3,003,960 | 10/1961 | Andress et al. | 252—51.5 X |
| 3,031,282 | 4/1962 | Andress et al. | 44—71 |
| 3,039,861 | 6/1962 | Andress et al. | 44—71 |
| 3,172,892 | 3/1965 | LeSuer et al. | 252—51.5 X |

DANIEL E. WYMAN, *Primary Examiner.*

P. P. GARVIN, *Assistant Examiner.*